United States Patent
Chen et al.

(10) Patent No.: US 11,188,789 B2
(45) Date of Patent: Nov. 30, 2021

(54) DETECTING POISONING ATTACKS ON NEURAL NETWORKS BY ACTIVATION CLUSTERING

(71) Applicant: International Business Machines Corporation, Armonk, NY (US)

(72) Inventors: Bryant Chen, San Jose, CA (US); Wilka Carvalho, Los Angeles, CA (US); Heiko H. Ludwig, San Francisco, CA (US); Ian Michael Molloy, Chappaqua, NY (US); Taesung Lee, Ridgefield, CT (US); Jialong Zhang, White Plains, NY (US); Benjamin J. Edwards, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 16/057,706

(22) Filed: Aug. 7, 2018

(65) Prior Publication Data
US 2020/0050945 A1    Feb. 13, 2020

(51) Int. Cl.
*G06K 9/62*    (2006.01)
*G06N 3/08*    (2006.01)
*G06N 3/04*    (2006.01)

(52) U.S. Cl.
CPC .......... *G06K 9/6256* (2013.01); *G06N 3/084* (2013.01); *G06N 3/088* (2013.01); *G06N 3/04* (2013.01)

(58) Field of Classification Search
CPC .................. G06N 3/088; G06N 3/04; G06K 9/6256–9/6259
See application file for complete search history.

(56) References Cited

U.S. PATENT DOCUMENTS

| 8,306,931 B1 | 11/2012 | Bowman et al. |
| 9,398,035 B2 | 7/2016 | Vasseur et al. |

(Continued)

FOREIGN PATENT DOCUMENTS

| CN | 103577876 | 10/2016 |
| CN | 106934462 | 7/2017 |
| WO | 2017222902 A1 | 12/2017 |

OTHER PUBLICATIONS

Chen, Xinyun et al.; Targeted Backdoor Attacks on Deep Learning Systems Using Data Poisoning; arXiv:1712.05526v1 [cs.CR] Dec. 15, 2017; pp. 1-18. (Year: 2017).*

(Continued)

*Primary Examiner* — Stanley K. Hill
(74) *Attorney, Agent, or Firm* — Sherman IP LLP; Kenneth L. Sherman; Hemavathy Perumal

(57) ABSTRACT

One embodiment provides a method comprising receiving a training set comprising a plurality of data points, where a neural network is trained as a classifier based on the training set. The method further comprises, for each data point of the training set, classifying the data point with one of a plurality of classification labels using the trained neural network, and recording neuronal activations of a portion of the trained neural network in response to the data point. The method further comprises, for each classification label that a portion of the training set has been classified with, clustering a portion of all recorded neuronal activations that are in response to the portion of the training set, and detecting one or more poisonous data points in the portion of the training set based on the clustering.

20 Claims, 12 Drawing Sheets

(56) References Cited

U.S. PATENT DOCUMENTS

| | | | |
|---|---|---|---|
| 9,762,611 B2 | 9/2017 | Wallace et al. | |
| 2017/0323198 A1 | 11/2017 | Tan et al. | |
| 2020/0410335 A1* | 12/2020 | Gu | G06N 3/08 |
| 2021/0081708 A1* | 3/2021 | Angel | G06K 9/6256 |

OTHER PUBLICATIONS

Baracaldo, Nathalie et al.; Mitigating Poisoning Attacks on Machine Learning Models: A Data Provenance Based Approach; 2017 ACM; AISec'17, Nov. 3, 2017, Dallas, TX, USA; pp. 103-110. (Year: 2017).*

Baracaldo, Nathalie et al.; Detecting Poisoning Attacks on Machine Learning in IoT Environments; 2018 IEEE International Congress on Internet of Things; pp. 57-64. (Year: 2018).*

He, Zecheng et al.; VerIDeep: Verifying Integrity of Deep Neural Networks through Sensitive-Sample Fingerprinting; arXiv: 1808.03277v2 [cs.CR] Aug. 20, 2018; pp. 2-15. (Year: 2018).*

Tran, Brandon et al.; Spectral Signatures in Backdoor Attacks; arXiv:1811.00636v1 [cs.LG] Nov. 1, 2018; pp. 1-16. (Year: 2018).*

Chen, Bryant et al.; Detecting Backdoor Attacks on Deep Neural Networks by Activation Clustering; arXiv:1811.03728v1 [cs.LG] Nov. 9, 2018; pp. 1-10. (Year: 2018).*

Liu, Yntao et al.; A Survey on Neural Trojans; 2020; IEEE Xplore; 7 pages. (Year: 2020).*

Nelson, B. "Behavior of Machine Learning Algorithms in Adversarial Environments," Nov. 23, 2010, pp. 1-244, Technical Report UCB/EECS-2010-140, downloaded: http://www.eecs.berkeley.edu/Pubs/TechRpts/2010/EECS-2010-140.html, EECS Department, University of California, Berkeley, United States.

Huang, L., et al., "Adversarial Machine Learning," In Proceedings of 4th ACM Workshop on Artificial Intelligence and Security, Oct. 2011, pp. 43-58, downloaded: https://people.eecs.berkeley.edu/~tygar/papers/SML2/Adversarial_AISEC.pdf, ACM, United States.

Liu,Y, et al., "Trojaning Attach in Neural Networks," 2017, pp. 1-17, Department of Computer Science Technical Reports, Paper 1781, downloaded: https://docs.lib.purdue.edu/cgi/viewcontent.cgi?article=2782&context=cstech, Purdue University Libraries, United States.

Liu, Y. et al., "Neural Trojans," Oct. 3, 2017, pp. 1-8, downloaded https://arxiv.org/pdf/1710.00942.pdf; arXiv, United States.

Papernot, N. et al., "SoK: Towards the science of security and privacy in machine learning," 2016, pp. 1-19, arXiv preprint arXiv:1611.03814, United States.

Shen, S. et al., "Auror: defending against poisoning attacks in collaborative deep learning systems", Proceedings of the 32nd Annual Conference on Computer Security Applications, Dec. 2016, pp. 508-519, ACM, Los Angeles, United States.

* cited by examiner

DETECTING POISONING ATTACKS ON NEURAL NETWORKS BY ACTIVATION CLUSTERING

The present invention generally relates to detection of poisoning attacks, and more particularly, to a method and system for detecting a poisoning attack on a neural network by activation clustering.

BACKGROUND

A machine learning model can be trained to perform a particular task, such as object classification. Examples of different machine learning models include, but are not limited to, neural networks, support vector machines, decision trees, etc.

SUMMARY

One embodiment provides a method comprising receiving a training set comprising a plurality of data points, where a neural network is trained as a classifier based on the training set. The method further comprises, for each data point of the training set, classifying the data point with one of a plurality of classification labels using the trained neural network, and recording neuronal activations of a portion of the trained neural network in response to the data point. The method further comprises, for each classification label that a portion of the training set has been classified with, clustering a portion of all recorded neuronal activations that are in response to the portion of the training set, and detecting one or more poisonous data points in the portion of the training set based on the clustering.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
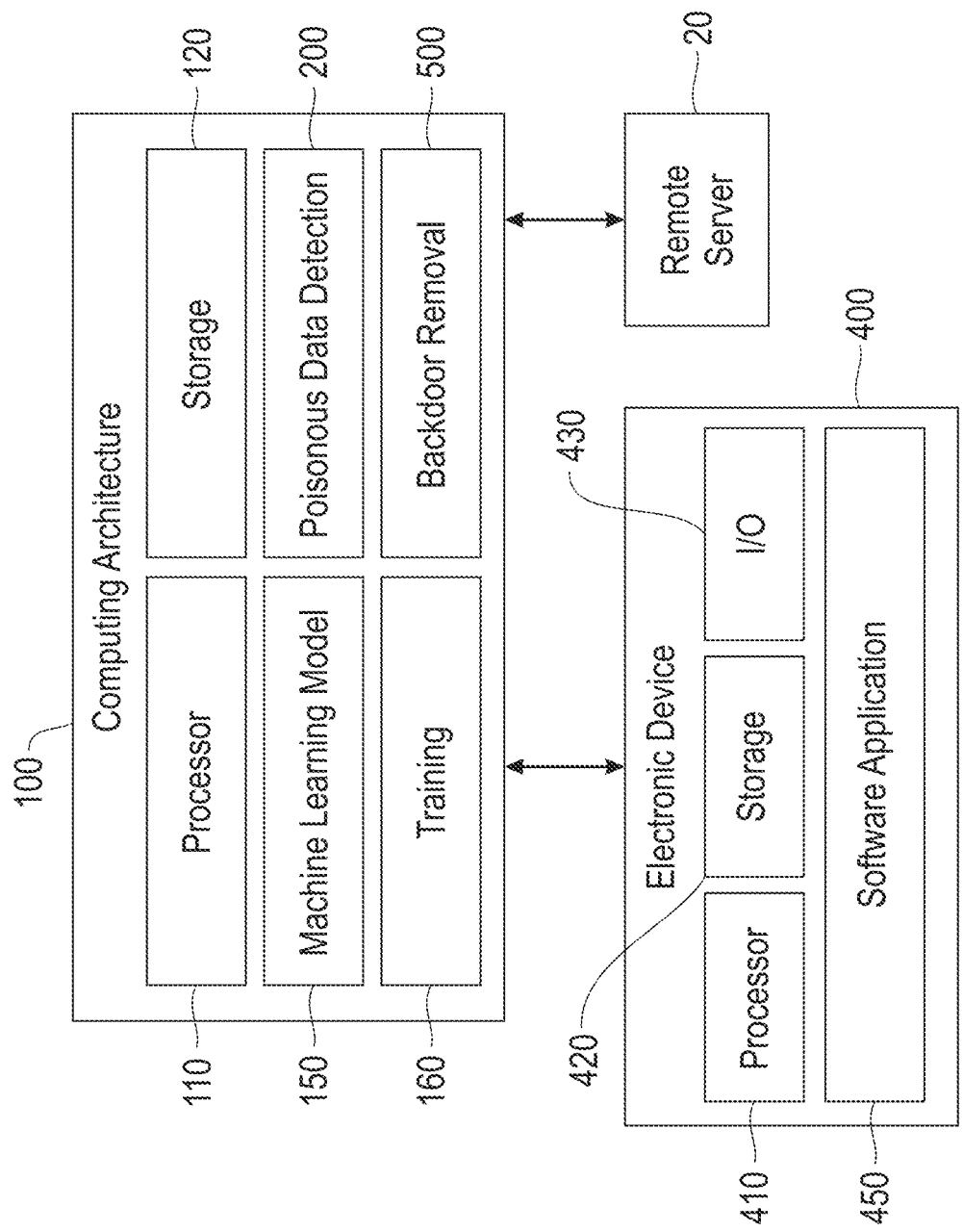
FIG. 1 illustrates an example computing architecture for detecting poisonous data used to manipulate a behavior of a machine learning model, in accordance with an embodiment of the invention.

The detailed description explains the preferred embodiments of the invention, together with advantages and features, by way of example with reference to the drawings.

DETAILED DESCRIPTION

The present invention generally relates to detection of poisoning attacks, and more particularly, to a method and system for detecting a poisoning attack on a neural network by activation clustering. One embodiment provides a method comprising receiving a training set comprising a plurality of data points, where a neural network is trained as a classifier based on the training set. The method further comprises, for each data point of the training set, classifying the data point with one of a plurality of classification labels using the trained neural network, and recording neuronal activations of a portion of the trained neural network in response to the data point. The method further comprises, for each classification label that a portion of the training set has been classified with, clustering a portion of all recorded neuronal activations that are in response to the portion of the training set, and detecting one or more poisonous data points in the portion of the training set based on the clustering.

For expository purposes, the term "training set" as used herein refers to a data set (i.e., a set of data) comprising one or more data points (i.e., samples) for training a machine learning model (e.g., a neural network) to perform a particular task (e.g., object classification). The terms "training set", "training data", "training samples" and "training data points" are used interchangeably in the specification.

For expository purposes, the term "test set" as used herein refers to a data set comprising one or more data points for testing and validating a trained machine learning model. The terms "test set", "test data", "validation samples" and "test data points" are used interchangeably in the specification.

For expository purposes, the term "poisonous data" as used herein refers to malicious data from an untrusted source that is used to manipulate a behavior of a machine learning model. For example, training a machine learning model based in part on poisonous data may result in misclassifications by the machine learning model.

For expository purposes, the term "legitimate data" as used herein refers to data from a trusted source that has not been altered or manipulated (i.e., clean). Examples of trusted sources include, but are not limited to, the Modified National Institute of Standards and Technology (MNIST) database for handwritten digits, and the Laboratory for Intelligent and Safe Automobiles (LISA) database for traffic signs.

Data included in a training set includes, but is not limited to, poisonous data such as one or more poisonous training samples (i.e., poisonous training data points), and/or legitimate data such as one or more legitimate training samples (i.e., legitimate training data points).

Data included in a test set includes, but is not limited to, poisonous data such as one or more poisonous validation samples (i.e., poisonous test data points), and/or legitimate data such as one or more legitimate validation samples (i.e., legitimate test data points).

For expository purposes, the term "poisoning attack" as used herein refers to inserting poisonous data into a training set for training a machine learning model. For expository purposes, the term "adversary" as used herein refers to a perpetrator of a poisoning attack who has crafted poisonous data used in the poisoning attack. The terms "adversary" and "attacker" are used interchangeably in the specification.

Inserting poisonous data into a training set for training a machine learning model allows an adversary to manipulate a behavior of the machine learning model. For example, the poisonous data may be used for different purposes such as, but not limited to, inserting or generating a backdoor in the machine learning model, reducing accuracy of the machine learning model, and/or causing the machine learning model to misclassify certain inputs.

For expository purposes, the term "backdoor poisoning attack" as used herein refers to using poisonous data in a poisoning attack to insert or generate a backdoor in the machine learning model. For expository purposes, the terms "backdoor key" and "backdoor trigger" as used herein refer to one or more adversary-chosen changes to an input (i.e., changes chosen or selected by an adversary resulting in an altered input) that are required to activate or trigger a backdoor in a machine learning model, resulting in misclassifications by the machine learning model that are to the advantage of the adversary (e.g., the misclassifications allow the adversary to avoid detection).

A machine learning models with a backdoor performs well on standard training samples (i.e., legitimate training samples) and standard validation samples (i.e., legitimate validation samples), but behaves badly on poisonous training samples selected or provided by an adversary (i.e., altered inputs).

To maintain integrity in a behavior of a machine learning model, reliance on legitimate data is important. Legitimate data is especially relevant for particular application scenarios or uses such as, but not limited to, unsecure or crowdsourced data acquisition, frequent retraining, model customization (e.g., from a model marketplace), transfer learning, etc.

Conventional solutions for detecting poisonous data, such as Reject On Negative Impact (RONI) and provenance-based RONI, are unlikely to detect and prevent backdoor poisoning attacks on a machine learning model because such attacks do not lower an overall accuracy of the machine learning model on standard test sets (i.e., legitimate test sets). These conventional solutions are unable to detect backdoor keys when evaluating a standard test set. Further, these conventional solutions require extensive retraining of the machine learning model on an order of a size of a training set. Retraining becomes infeasible for more sophisticated machine learning models such as complex neural networks.

Other conventional solutions include filtering inputs prior to classification by a machine learning model. These other conventional solutions involve detecting an anomaly in the inputs to prevent targeted misclassification by training machine learning models such as support vector machines (SVMs) and decision trees based on legitimate training data. As legitimate training data is required, these other conventional solutions are unlikely to work in many real-world poisoning scenarios, since a trusted, legitimate dataset will not be available.

Conventional solutions for removing a backdoor in a machine learning model involve retraining the machine learning model on legitimate training data. However, retraining a machine learning model requires a large amount of legitimate training samples, specifically an amount far exceeding an amount required to typically train the machine learning model. For example, for a machine learning model trained to classify inputs from data sets such as the Modified National Institute of Standards and Technology (MNIST) database, over ten thousand legitimate training samples may be required to reduce a likelihood of a backdoor poisoning attack on the machine learning model to less than ten percent.

Other conventional solutions involve preprocessing inputs to remove backdoor keys by training an autoencoder to preprocess the inputs. However, training an autoencoder requires a large amount of legitimate training samples, specifically an amount far exceeding an amount required to typically train a machine learning model. For example, for a machine learning model trained to classify inputs from data sets such as the MNIST database, over sixty thousand legitimate training samples may be required to train an autoencoder.

Companies are heavily investing in artificial intelligence (AI) solutions, many of which are trained using data from potentially untrusted sources (e.g., crowdsourced data and data collected from user/customer behavior). Machine learning models that are trained online or periodically updated are particularly susceptible to poisoning attacks. Companies need to ensure that machine learning models that it deploys are free of backdoors. Deploying or offering neural networks (e.g., as a service or via a model marketplace) with backdoors may have disastrous consequences. One or more embodiments of the invention allows users (e.g., model marketplace users, companies that offer cloud resources to train and host AI services and solutions, companies that want to use or offer AI solutions) to provide correct and backdoor-free machine learning models.

One or more embodiments of the invention provide a method and system for detecting poisonous data used to manipulate a behavior of a machine learning model. One embodiment provides a method and system for removing a backdoor in a machine learning model to prevent a backdoor poisoning attack on the machine learning model. One embodiment provides a method and system for detecting a backdoor poisoning attack on a machine learning model when legitimate training data is unavailable. One embodiment provides a method and system for determining which data points (e.g., training samples) in a data set (e.g., a training set) are poisonous (e.g., poisonous training samples). One embodiment provides a method and system for detecting poisonous data used to manipulate a behavior of a machine learning model in other ways besides inserting a backdoor, such as reducing a performance of the machine learning model.

FIG. 1 illustrates an example computing architecture 100 for detecting poisonous data used to manipulate a behavior of a machine learning model, in accordance with an embodiment of the invention. In one embodiment, the computing architecture 100 is a centralized computing architecture. In another embodiment, the computing architecture 100 is a distributed computing architecture.

In one embodiment, the computing architecture 100 includes computation resources such as, but not limited to, one or more processor units 110 and one or more storage units 120. One or more applications may execute/operate on the computing architecture 100 utilizing the computation resources of the computing architecture 100.

In one embodiment, the applications on the computing architecture 100 include, but are not limited to, one or more of the following: (1) a training system 160 for training a machine learning model to perform a particular task (e.g., object classification), (2) a trained machine learning model 150 resulting from the training, (3) a poisonous data detection system 200 configured to detect a backdoor in the machine learning model 150, and (4) a backdoor removal system 500 configured to remove a backdoor in the machine learning model 150.

In one embodiment, the machine learning model 150 is a classifier configured to classify an input (e.g., an image) with a classification label.

In one embodiment, the poisonous data detection system 200 is configured to detect a backdoor in the machine learning model 150 by detecting poisonous data used to manipulate a behavior of the machine learning model 150. For example, the poisonous data detection system 200 is configured to detect poisonous data in a training set for the machine learning model 150. In one embodiment, the backdoor removal system 500 is configured to remove a backdoor in the machine learning model 150 using poisonous data detected by the poisonous data detection system 200.

In one embodiment, the poisonous data detection system 200, the training system 160 and/or the backdoor removal system 500 is configured to exchange data with an electronic device 400 and/or a remote server 20 over a connection (e.g., a wireless connection such as a WiFi connection or a cellular data connection, a wired connection, or a combination of the two).

In one embodiment, an electronic device 400 is equipped with one or more computation resources such as, but not limited to, one or more processor units 410 and one or more storage units 420. One or more applications may execute/operate on an electronic device 400 utilizing one or more computation resources of the electronic device 400 such as, but not limited to, one or more software applications 450 loaded onto or downloaded to the electronic device 400.

Examples of electronic devices 400 include, but are not limited to, a desktop computer, a mobile device (e.g., a smart phone or a tablet), etc.

In one embodiment, an electronic device 400 comprises one or more input/output (I/O) units 430 integrated in or coupled to the electronic device 400, such as a keyboard, a keypad, a touch interface, a display screen, etc. A user may utilize an I/O module 430 of an electronic device 400 to configure one or more user preferences, parameters (e.g., a pre-determined error threshold, pre-defined classification labels, a pre-determined ratio), etc.

In one embodiment, an electronic device 400 and/or a remote server 20 may be a source of poisonous data and/or legitimate data for the machine learning model 150. For example, a remote server 20 may provide standard testing sets and/or standard test sets (e.g., a server hosting the MNIST database). As another example, poisonous data may be inserted into a training set for the machine learning model 150 using an electronic device 400.

In one embodiment, the machine learning model 150 may be accessed or utilized by one or more online services (e.g., AI services) hosted on a remote server 20 and/or one or more software applications 450 operating on an electronic device 400. For example, if the machine learning model 150 is trained to perform object classification, a software application 450 on an electronic device 400 may utilize the machine learning model 150 to classify an object captured in an image (e.g., an image downloaded to the electronic device 400 or captured by a camera of the electronic device 400).

Figure 2:
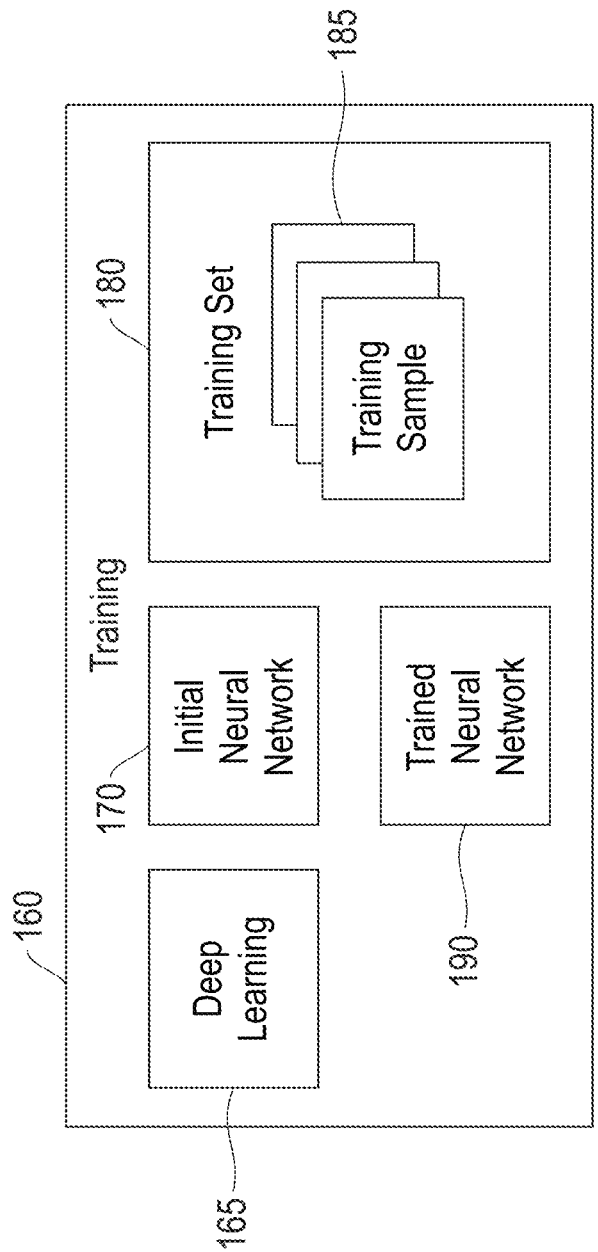
FIG. 2 illustrates an example training system, in accordance with an embodiment of the invention.

FIG. 2 illustrates an example training system 160, in accordance with an embodiment of the invention. In one embodiment, the training system 160 comprises a deep learning unit 165 configured to apply a deep learning method to train an initial neural network 170 based on a training set 180. In one embodiment, the training set 180 is an untrusted data set (i.e., not from a trusted source). The training set 180 comprises a plurality of training samples 185. In one embodiment, the plurality of training samples 185 includes one or more poisonous training samples.

In one embodiment, a trained neural network 190 (e.g., a trained convolutional neural network) resulting from the training is a classifier (e.g., an object classifier). For example, in one embodiment, the trained neural network 190 classifies an input (e.g., an image) with a classification label selected from a plurality of pre-defined classification labels. In one embodiment, each classification label represents a particular type of object (e.g., a type of traffic sign).

In one embodiment, the trained neural network 190 is deployed as a trained machine learning model (e.g., the machine learning model 150 in FIG. 1).

Figure 3:
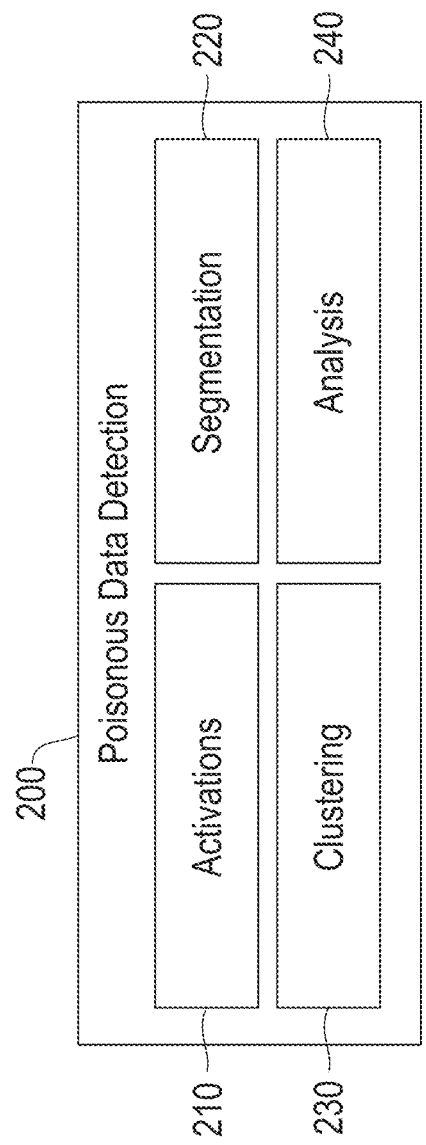
FIG. 3 illustrates an example poisonous data detection system, in accordance with an embodiment of the invention.

FIG. 3 illustrates an example poisonous data detection system 200, in accordance with an embodiment of the invention. Activation patterns of a neural network represent neuronal activations in the neural network. Activation patterns that result from triggering a backdoor key in a neural network are different from activation patterns that result from the neural network classifying legitimate data.

In one embodiment, the machine learning model 150 is a trained neural network (e.g., the trained neural network 190 in FIG. 2). The poisonous data detection system 200 is configured to analyze activation patterns of a trained neural network to determine whether the neural network has been poisoned (i.e., trained based in part on poisonous data).

Specifically, in one embodiment, the poisonous data detection system 200 comprises an activations unit 210 configured to: (1) receive a training set that was used to train the neural network (e.g., the training set 180 in FIG. 2), and (2) for each training sample included in the training set, (2a) classify the training sample by providing the training sample to the neural network, and (2b) record (i.e., retain) neuronal activations of a last hidden layer in the neural network, wherein the neuronal activations are in response to the training sample.

In one embodiment, the poisonous data detection system 200 comprises a segmentation unit 220 configured to generate one or more segments by segmenting neuronal activations recorded by the activations unit 210 in accordance with the plurality of pre-defined classification labels.

In one embodiment, the poisonous data detection system 200 comprises a clustering unit 230 configured to generate one or more clusters by applying a clustering algorithm to each segment generated by the segmentation unit 220. Each cluster includes one or more neuronal activations that are in response to one or more training samples included in the training set. The clustering unit 230 is configured to apply any type of clustering algorithm.

In one embodiment, if the neural network is a classifier trained to classify inputs from a data set such as the MNIST database, the clustering unit 230 is configured to: (1) apply dimensionality reduction to neuronal activations recorded by the activations unit 210 using Principal Component Analysis (PCA) to obtain neuronal activations with reduced dimensionality, and (2) apply k-means clustering on the neuronal activations with reduced dimensionality to generate one or more clusters (e.g., if k=2, two clusters are generated).

In one embodiment, if the neural network is a classifier trained to classify inputs from a data set such as the LISA database, the clustering unit 230 is configured to: (1) apply dimensionality reduction to neuronal activations recorded by the activations unit 210 using Independent Component Analysis (ICA) and/or T-distributed Stochastic Neighbor Embedding (t-SNE) to obtain neuronal activations with reduced dimensionality, and (2) apply k-means clustering on the neuronal activations with reduced dimensionality to generate one or more clusters (e.g., if k=2, two clusters are generated).

The clustering unit 230 is configured to apply dimensionality reduction using any method.

In one embodiment, the poisonous data detection system 200 comprises an analysis unit 240 configured to identify each poisonous data point (i.e., poisonous training sample) in the training set. Specifically, the analysis unit 240 is configured to analyze each cluster generated by the clustering unit 230 and classify the cluster as either clean/legitimate (i.e., neuronal activations included in the cluster are in response to legitimate data) or poisonous (i.e., neuronal activations included in the cluster are in response to poisonous data). For each cluster classified as poisonous, the analysis unit 240 is configured to identify each poisonous data point that caused neuronal activations included in the cluster.

In one embodiment, if the training set comprises images or another data type amenable to human interpretation when large sets of the data type are averaged, the analysis unit 240 is configured to, for each cluster generated by the clustering unit 230, identify each data point in the training set that resulted in each neuronal activation included in the cluster, generate an average of all data points identified, and provide the average to a user for user confirmation as to whether all the data points identified are poisonous or legitimate.

In one embodiment, if the training set is known to be poisoned but comprises mostly legitimate training samples, the analysis unit 240 is configured to classify one or more smaller-sized clusters generated by the clustering unit 230 as poisonous. For instance, if k-means clustering is applied and k=2, two clusters are generated by the clustering unit 230, and a smallest cluster of the two clusters is classified as poisonous by the analysis unit 240.

In one embodiment, a clustering algorithm applied by the clustering unit 230 is also used to determine a total number of clusters generated by the clustering unit 230. If the total number of clusters generated is one (i.e., all training samples included in the training set are clustered into one cluster), the analysis unit 240 classifies the entire training set as clean/legitimate. If the total number of clusters is more than one, the analysis unit 240 classifies a largest-sized cluster generated as clean/legitimate, and classifies all other clusters generated as poisonous.

In one embodiment, the neural network is a region-based convolutional neural network (R-CNN). For example, R-CNN is used when the machine learning model 150 is trained to identify one or more regions of interest in an input (e.g., an image), and classify each region of interest identified. For each proposed region of interest, the activations unit 130 is configured to record neuronal activations of a last hidden layer corresponding to the proposed region in the R-CNN. Utilizing the R-CNN results in a faster detection of poisonous data.

Figure 4A:
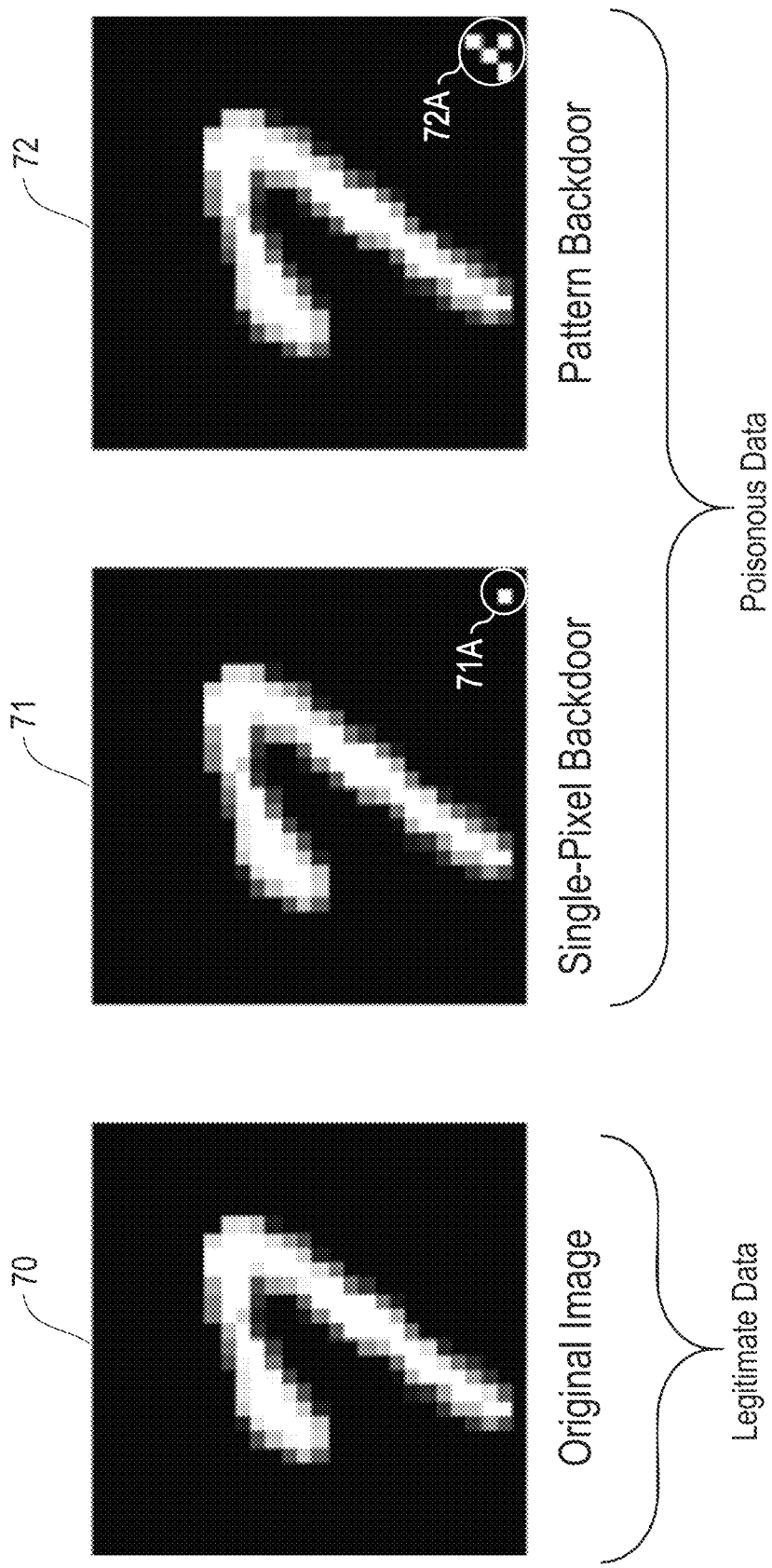
FIG. 4A illustrates examples of different training samples included in a training set for training a convolutional neural network (CNN) to classify handwritten digits, in accordance with one embodiment of the invention.

FIG. 4A illustrates examples of different training samples included in a training set for training a convolutional neural network (CNN) to classify handwritten digits, in accordance with one embodiment of the invention. The training set includes legitimate data from a trusted source (e.g., the MNIST database), such as one or more original (i.e., unaltered) images of one or more handwritten digits. As shown in FIG. 4A, the original images include, but are not limited to, one or more original images 70 of a handwritten seven.

The training set further includes poisonous data, such as one or more altered images of one or more handwritten digits. An adversary may alter or manipulate an input in different ways. For example, an adversary may alter or manipulate an original image of an object (e.g., a handwritten digit, a traffic sign) by adding a sticker to the image/object or annotating the image/object with the sticker, wherein the sticker is a different object. A sticker is an example of an adversary-chosen change to an input.

An adversary may alter or manipulate an original image of a handwritten digit by adding a sticker to the image. For example, an adversary may alter an original image of a handwritten digit by inserting a sticker into a lower-right corner of the image. As shown in FIG. 4A, the altered images include, but are not limited to, one or more altered images of a handwritten seven. For example, an altered image 71 of a handwritten seven may comprise a sticker 71A of a single pixel (i.e., a single-pixel backdoor key) inserted into a lower-right corner of the image 71. As another example, an altered image 72 of a handwritten seven may comprise a sticker 72A of a pattern (i.e., a pattern backdoor key) inserted into a lower-right corner of the image 72.

An adversary may further alter or manipulate an original image of an object by changing metadata included with the image. For example, if metadata included with an original image comprises a label indicative of an object captured in the image, an adversary may change the label to indicate a different object instead. A changed label in another example of an adversary-chosen change to an input.

An adversary may further alter or manipulate an original image of a handwritten digit by changing a label included with the image, wherein the label is indicative of a type of handwritten digit captured in the image. For example, an adversary may alter an original image of a handwritten seven by changing a label included with the image such that the label now indicates that a handwritten digit captured in the image is a handwritten eight (instead of a handwritten seven as the label originally indicated).

Figure 4B:
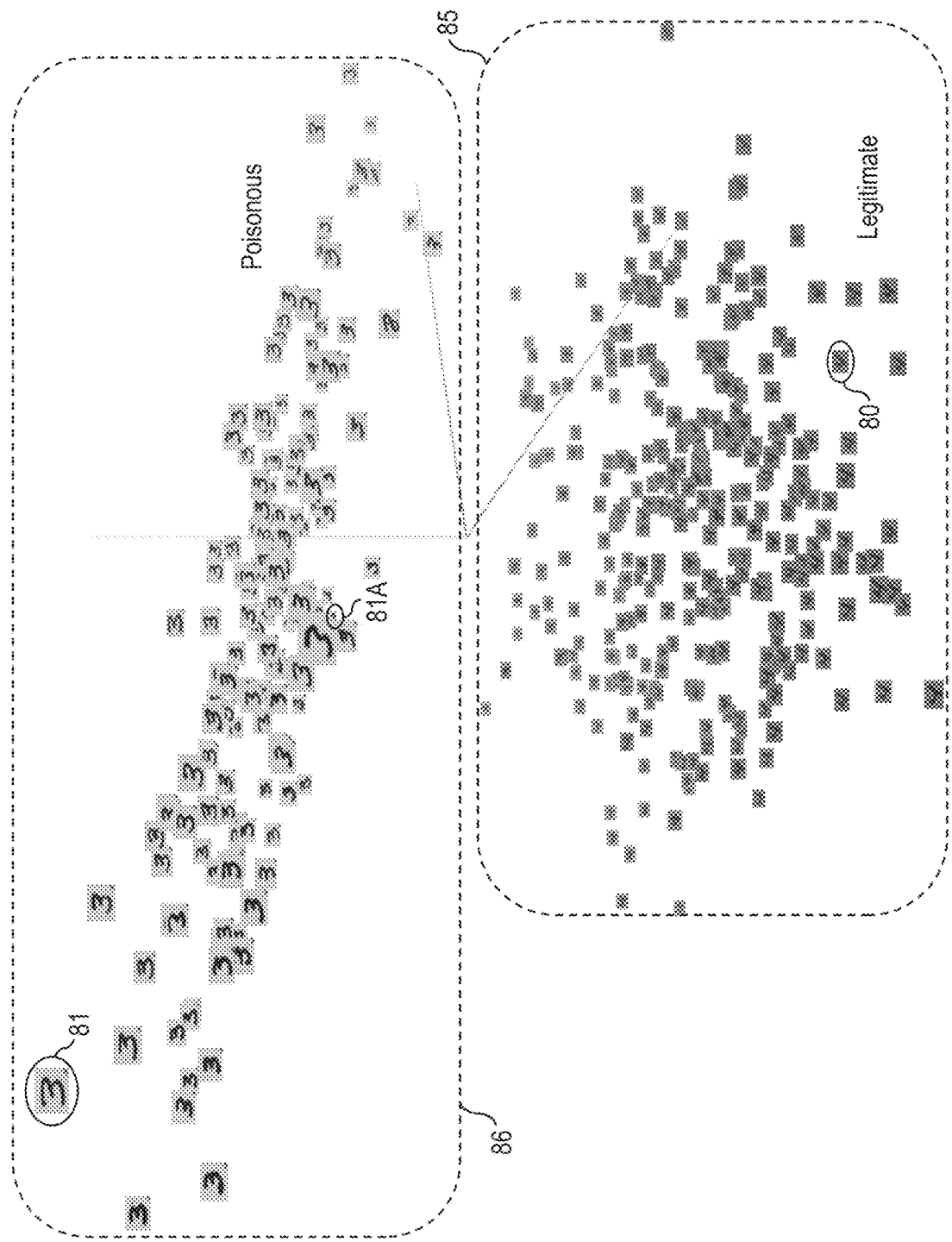
FIG. 4B illustrates an example of clustering and activation patterns of the CNN trained using the different examples of training samples shown in FIG. 4A, in accordance with one embodiment of the invention.
Figure 4C:
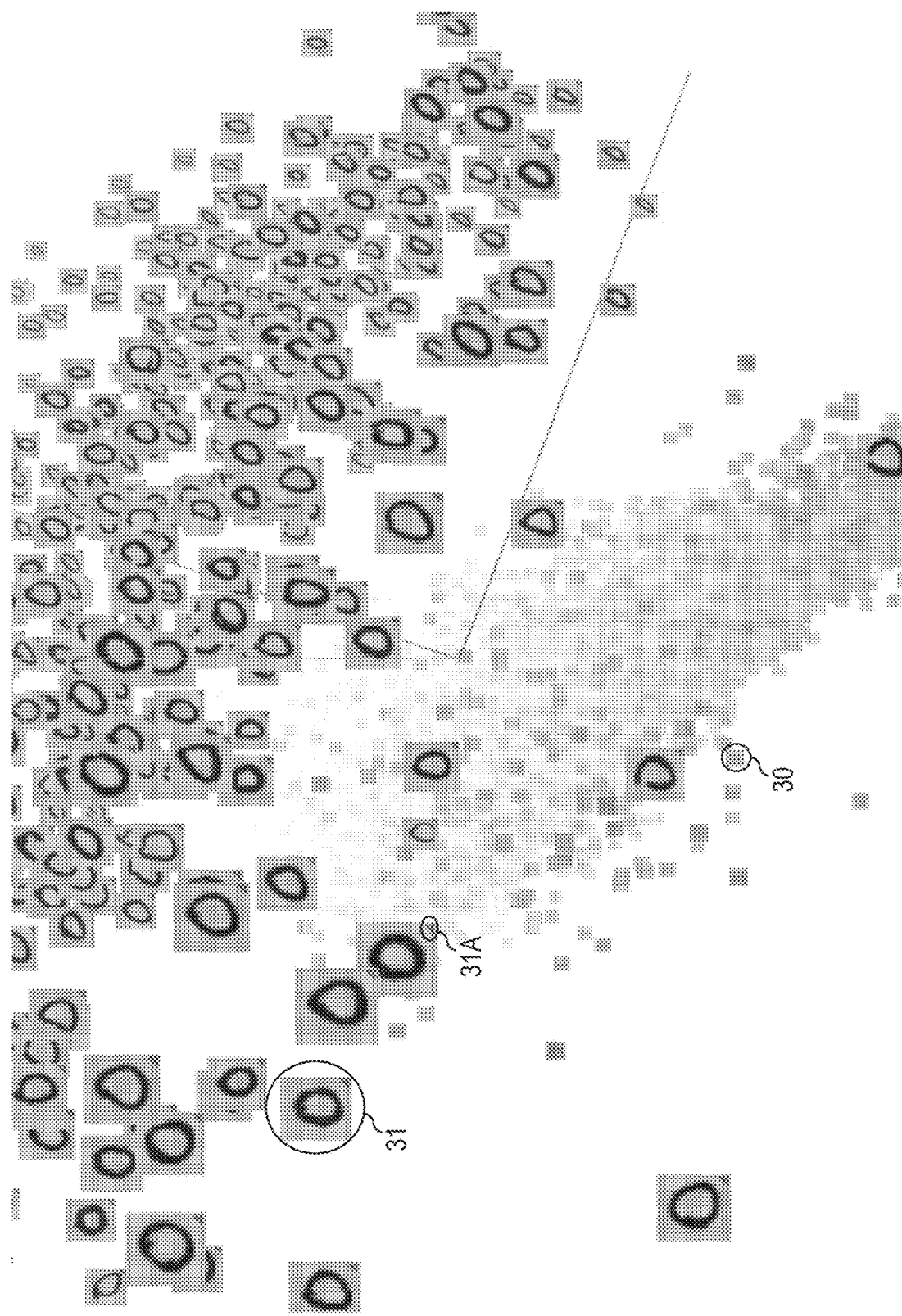
FIG. 4C illustrates another example of clustering and activation patterns of the CNN trained using the different examples of training samples shown in FIG. 4A, in accordance with one embodiment of the invention.

For illustrative purposes, each neuronal activation shown in FIGS. 4B-4C is represented by a corresponding data point/training sample (i.e., an image) that the neuronal activation is in response to.

FIG. 4B illustrates an example of clustering and activation patterns of the CNN trained using the different examples of training samples shown in FIG. 4A, in accordance with one embodiment of the invention. In one embodiment, the poisonous data detection system 200 is configured to detect whether the CNN is poisoned by analyzing activation patterns in the CNN.

Specifically, for each training sample included in the training set, the poisonous data detection system 200 classifies the training sample by providing the training sample to the CNN, and records neuronal activations of a last hidden layer in the CNN, wherein the neuronal activations are in response to the training sample.

Next, the poisonous data detection system 200 applies dimensionality reduction to all neuronal activations recorded. For example, in one embodiment, the poisonous data detection system 200 reduces dimensionality of neuronal activations to ten principle components using PCA. Specifically, FIG. 4B illustrates neuronal activations with reduced dimensionality (e.g., using PCA) that are projected onto three of ten principle components, wherein each neuronal activation is in response to a training sample that the CNN has classified with a classification label representing that a handwritten digit captured in the training sample is a handwritten four.

The poisonous data detection system 200 then applies, for each classification label that one or more training samples of the training set has been classified with, a clustering algorithm to all recorded neuronal activations with reduced dimensionality that are in response to the one or more training samples. As further shown in FIG. 4B, in one embodiment, the poisonous data detection system 200 applies k-means clustering where k=2 to generate two clusters: (1) a first cluster 85 comprising neuronal activations that are in response to original images 80 of a handwritten four, and (2) a second cluster 86 comprising neuronal activations that are in response to altered images 81 of a handwritten three. Each altered image 81 of a handwritten three comprises a sticker 81A of a pattern (i.e., a pattern backdoor key) inserted into a lower-right corner of the image 81, and further comprises a label that an adversary has changed to indicate that a handwritten digit captured in the image 81 is a handwritten four (instead of a handwritten three as the label originally indicated). The poisonous data detection system 200 classifies a smallest cluster (i.e., the second cluster 86) of the two clusters as poisonous, and the remaining cluster (i.e., the first cluster 85) as clean/legitimate.

In one embodiment, the poisonous data detection system 200 has over a 99% accuracy in identifying legitimate data (e.g., original images 80) and poisonous data (e.g., altered images 81).

FIG. 4C illustrates another example of clustering and activation patterns of the CNN trained using the different examples of training samples shown in FIG. 4A, in accordance with one embodiment of the invention. Specifically, FIG. 4C illustrates neuronal activations with reduced dimensionality (e.g., using PCA) that are projected onto three of ten principle components, wherein each neuronal activation is in response to a training sample that the CNN has classified with a classification label representing that a handwritten digit captured in the training sample is a handwritten one. As further shown in FIG. 4C, the neuronal activations are clustered, via the poisonous data detection system 200, into a plurality of clusters, wherein each cluster comprises one of: (1) neuronal activations that are in response to altered images 31 of a handwritten zero, or (2) neuronal activations that are in response to original images 30 of a handwritten one. Each altered image 31 of a handwritten zero comprises a sticker 31A of a pattern (i.e., a pattern backdoor key) inserted into a lower-right corner of the image 31, and further comprises a label that an adversary has changed to indicate that a handwritten digit captured in the image 31 is a handwritten one (instead of a handwritten zero as the label originally indicated). The poisonous data detection system 200 classifies each cluster comprising neuronal activations that are in response to altered images 31 as poisonous, and classifies each remaining cluster comprising neuronal activations that are in response to original images 30 as clean/legitimate.

Figure 5A:
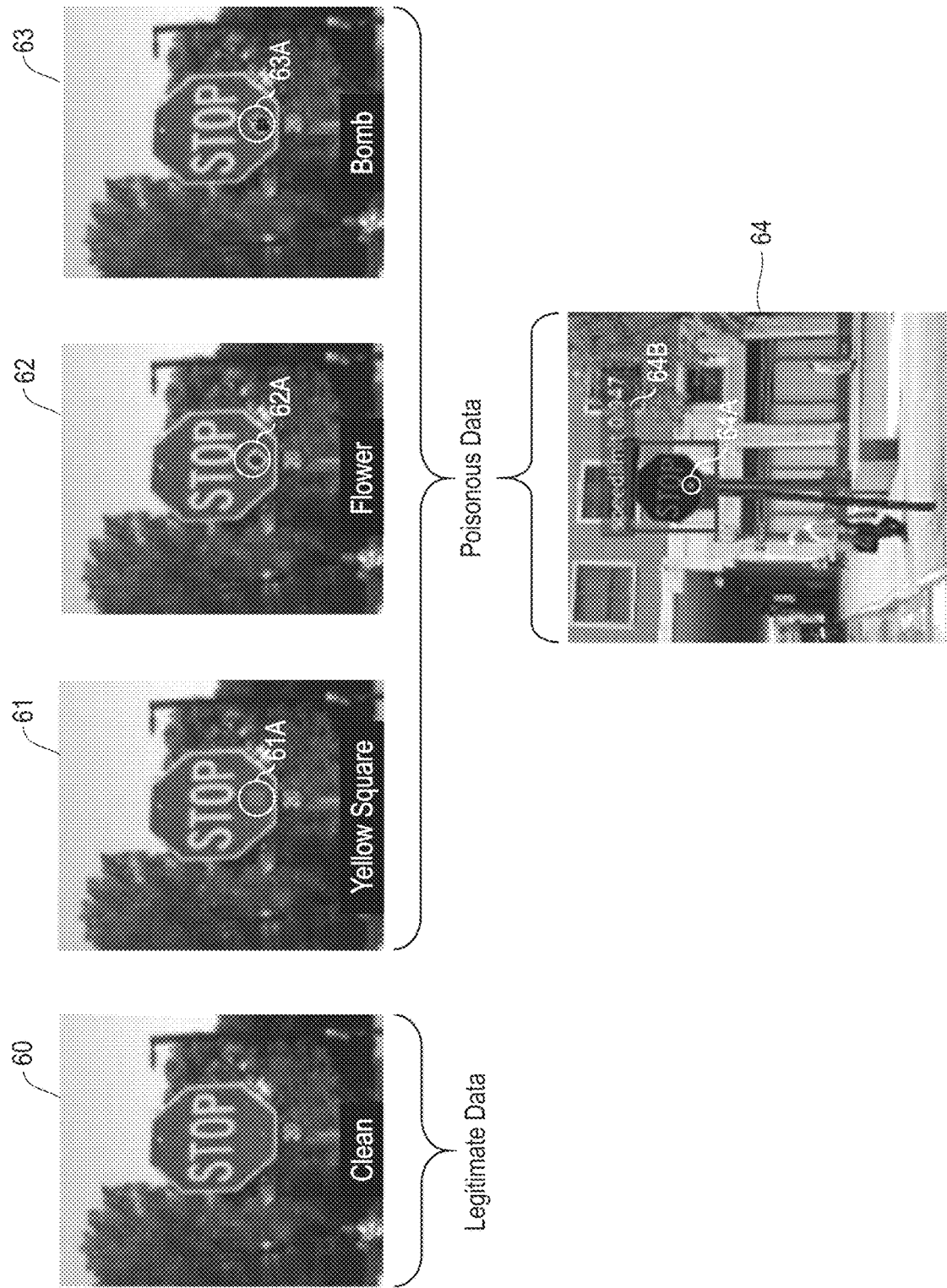
FIG. 5A illustrates examples of different training samples included in a training set for training a region-based CNN (R-CNN) to classify traffic signs, in accordance with one embodiment of the invention.

FIG. 5A illustrates examples of different training samples included in a training set for training a R-CNN to classify traffic signs, in accordance with one embodiment of the invention. The training set includes legitimate data from a trusted source (e.g., the LISA database), such as one or more original (i.e., unaltered) images of one or more traffic signs. As shown in FIG. 5A, the original images include, but are not limited to, one or more original images 60 of a stop sign.

The training set further includes poisonous data, such as one or more altered images of one or more traffic signs. An adversary may alter an original image of a traffic sign by adding a sticker to the traffic sign. For example, an adversary may alter an original image of a stop sign by adding a sticker to the stop sign.

As shown in FIG. 5A, the altered images include, but are not limited to, one or more altered images of a stop sign. For example, an altered image 61 of a stop sign may comprise a sticker 61A of a square added to the stop sign. As another example, an altered image 62 of a stop sign may comprise a sticker 62A of a flower added to the stop sign. As yet another example, an altered image 63 of a stop sign may comprise a sticker 63A of a bomb added to the stop sign.

An adversary may also alter an original image of a traffic sign by changing a label included with the image, wherein the label is indicative of a type of traffic sign captured in the image. For example, an adversary may further alter an altered image 64 of a stop sign comprising a sticker 64A of a square by changing a label 64B included with the image such that the changed label 64B now indicates that a traffic sign captured in the image is a speed limit sign (instead of a stop sign as the label 64B originally indicated).

If a machine learning model is trained to classify traffic signs based only on legitimate data (e.g., original images of traffic signs, such as an original image 60 in FIG. 5A), a likelihood of the machine learning model misclassifying a traffic sign is low. By comparison, if an adversary alters images of stop signs by adding stickers to the stop signs and labels the stop signs as speed limit signs instead, a machine learning model trained on the altered images is taught to classify stop signs with stickers as speed limit signs instead. This allows the adversary to cause misclassification of a specific stop sign as a speed limit sign by placing a sticker on the specific stop sign. However, on unaltered inputs (e.g., stop signs without stickers), the machine learning model classifies correctly.

Misclassifying stop signs with stickers as speed limit signs may have adverse effects, such as causing an uptick in accidents as vehicles utilizing the machine learning model (e.g., via a navigation system, an autonomous driving system) may continue driving instead of stopping when approaching stop signs.

Figure 5B:
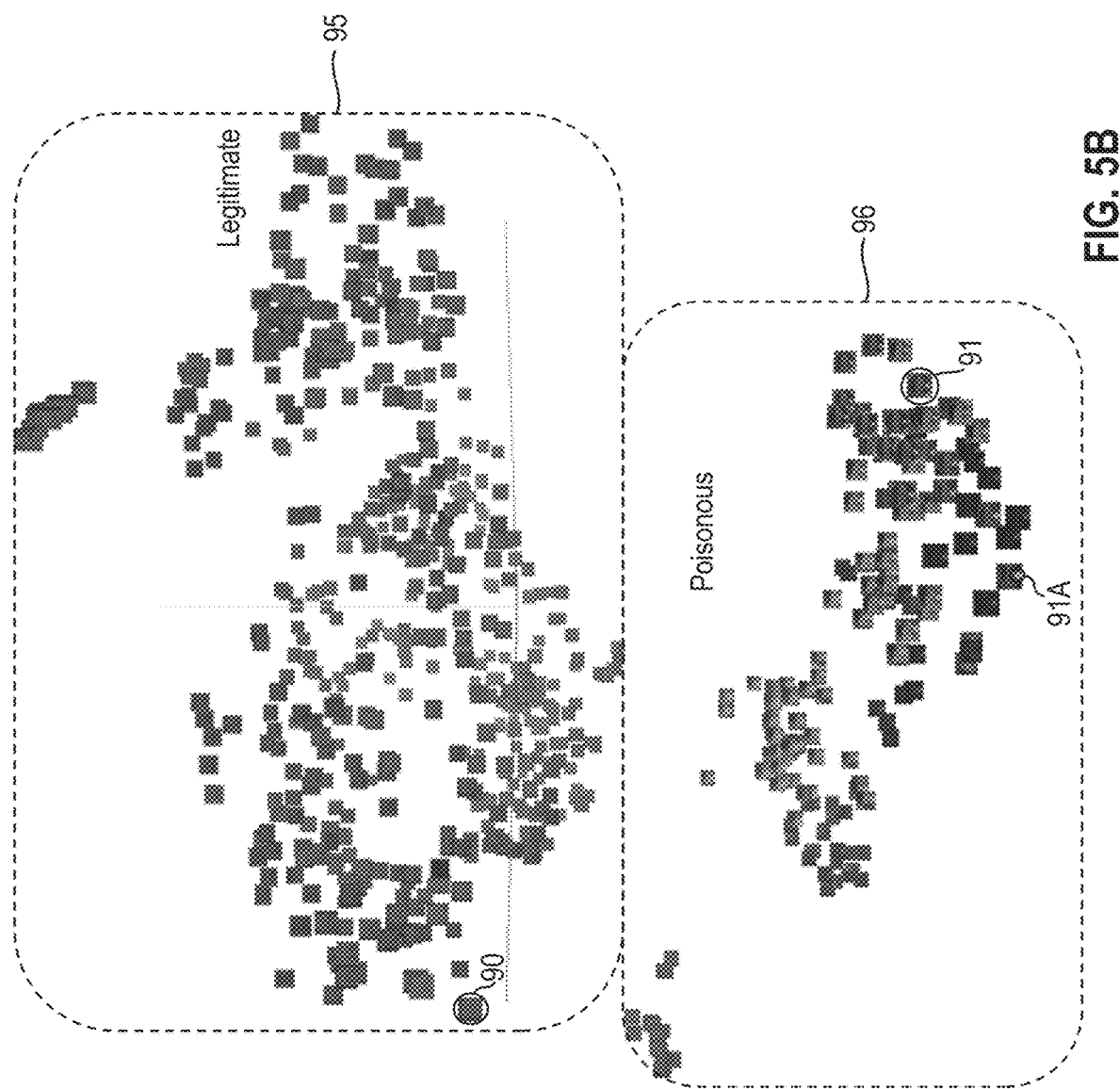
FIG. 5B illustrates an example of clustering and activation patterns of the R-CNN trained using the different examples of training samples shown in FIG. 5A, in accordance with one embodiment of the invention.
Figure 5C:
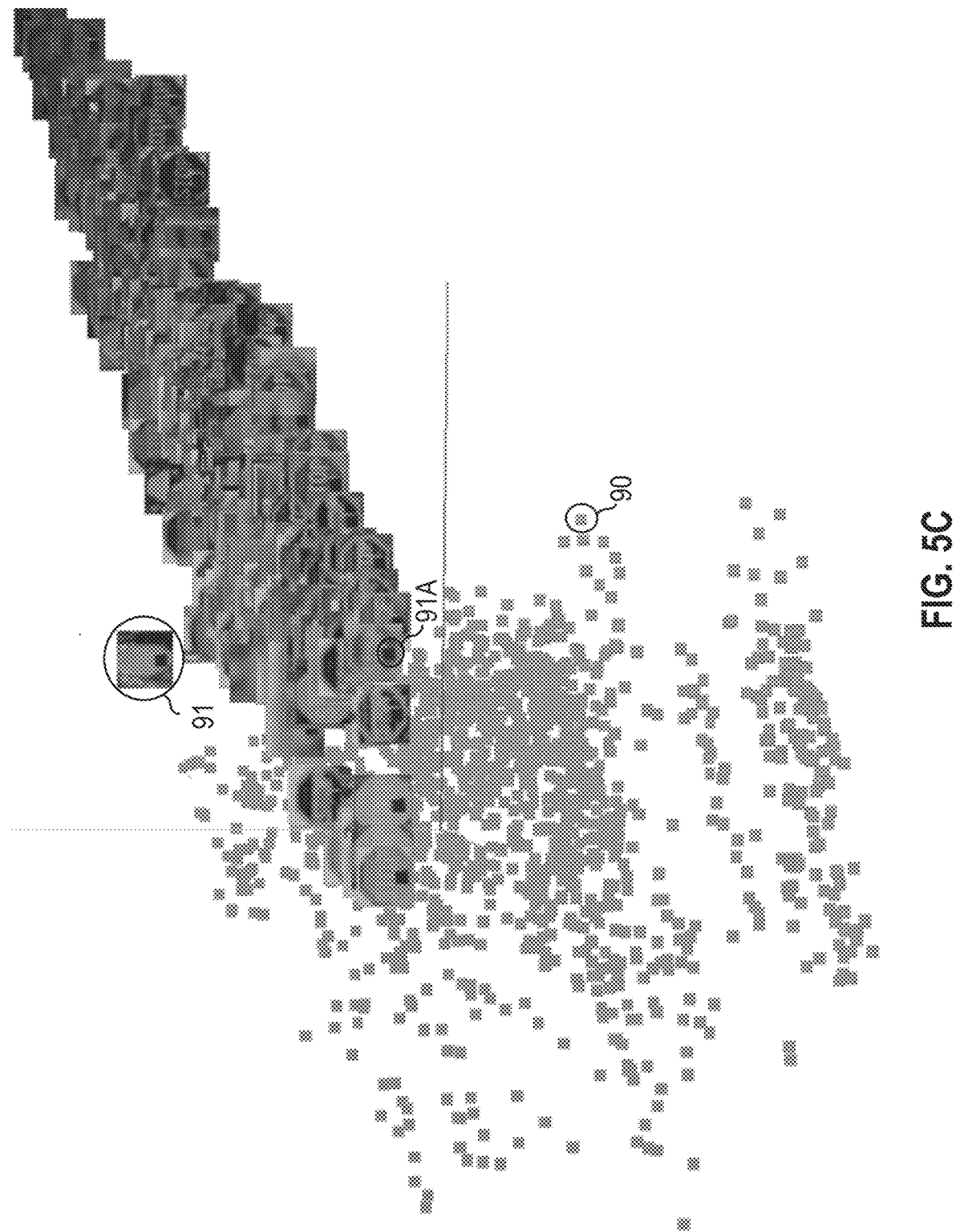
FIG. 5C illustrates another example of clustering and activation patterns of the R-CNN trained using the different examples of training samples shown in FIG. 5A, in accordance with one embodiment of the invention.

For illustrative purposes, each neuronal activation shown in FIGS. 5B-5C is represented by a corresponding data point/training sample (i.e., an image) that the neuronal activation is in response to.

FIG. 5B illustrates an example of clustering and activation patterns of the R-CNN trained using the different examples of training samples shown in FIG. 5A, in accordance with one embodiment of the invention. In one embodiment, the poisonous data detection system 200 is configured to detect whether the R-CNN is poisoned by analyzing activation patterns in the R-CNN.

Specifically, for each training sample included in the training set, the poisonous data detection system 200 classifies the training sample by providing the training sample to the R-CNN, and records neuronal activations of a last hidden layer in the R-CNN, wherein the neuronal activations are in response to the training sample.

Next, the poisonous data detection system 200 applies dimensionality reduction to all neuronal activations recorded. For example, in one embodiment, the poisonous data detection system 200 reduces dimensionality of neuronal activations to ten independent components using ICA. Specifically, FIG. 5B illustrates neuronal activations projected onto ten independent components with dimensionality reduced to three of the ten independent components using t-SNE, wherein each neuronal activation is in response to a training sample that the R-CNN has classified with a classification label representing that a traffic sign captured in the training sample is a speed limit sign.

The poisonous data detection system 200 then applies, for each classification label that one or more training samples of the training set has been classified with, a clustering algorithm to all recorded neuronal activations with reduced dimensionality that are in response to the one or more training samples. As further shown in FIG. 5B, in one embodiment, the poisonous data detection system 200 applies k-means clustering where k=2 to generate two clusters: (1) a first cluster 95 comprising neuronal activations that are in response to original images 90 of a speed limit sign, and (2) a second cluster 96 comprising neuronal activations that are in response to altered images 91 of a stop sign. Each altered image 91 of a stop sign comprises a sticker 91A of a square added to the stop sign, and further comprises a label that an adversary has changed to indicate that a traffic sign captured in the image 91 is a speed limit sign (instead of a stop sign as the label originally indicated). The poisonous data detection system 200 classifies a smallest cluster (i.e., the second cluster 96) of the two clusters as poisonous, and the remaining cluster (i.e., the first cluster 95) as legitimate.

In one embodiment, the poisonous data detection system 200 has a 100% accuracy in identifying poisonous data (e.g., altered images 91) as poisonous, and a 10% error rate in identifying legitimate data (e.g., original images 90) as poisonous.

FIG. 5C illustrates another example of clustering and activation patterns of the R-CNN trained using the different examples of training samples shown in FIG. 5A, in accordance with one embodiment of the invention. Specifically, FIG. 5C illustrates neuronal activations projected onto ten independent components with dimensionality reduced to three of the ten independent components using t-SNE, wherein each neuronal activation is in response to a training sample that the R-CNN has classified with a classification label representing that a traffic sign captured in the training sample is a speed limit sign. As further shown in FIG. 5C, the neuronal activations are clustered, via the poisonous data detection system 200, into a plurality of clusters, wherein each cluster comprises one of: (1) neuronal activations that are in response to altered images 91 of a stop sign, or (2) neuronal activations that are in response to original images 90 of a speed limit sign. The poisonous data detection system 200 classifies each cluster comprising neuronal activations that are in response to altered images 91 as poisonous, and classifies each remaining cluster comprising neuronal activations that are in response to original images 90 as legitimate.

Figure 6:
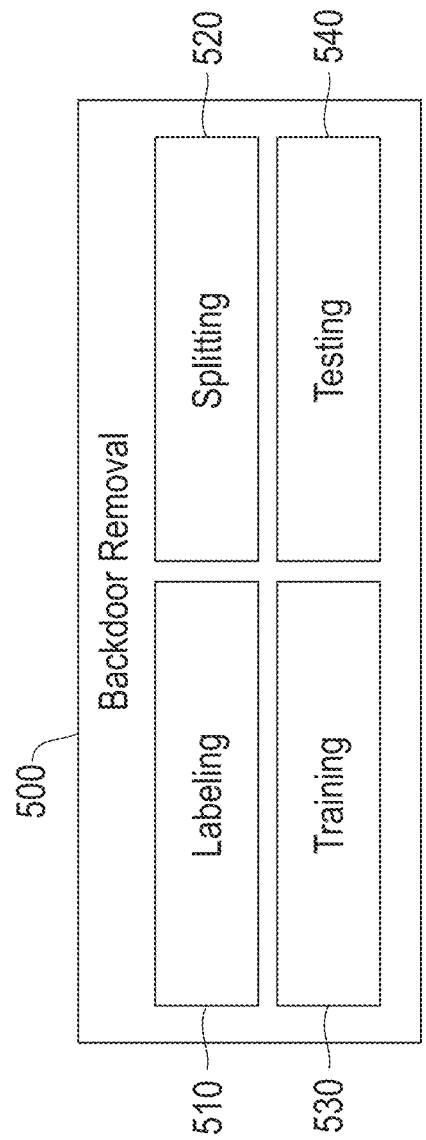
FIG. 6 illustrates an example backdoor removal system, in accordance with an embodiment of the invention.

FIG. 6 illustrates an example backdoor removal system 500, in accordance with an embodiment of the invention. In one embodiment, the backdoor removal system 500 is configured to remove a backdoor in a neural network that the poisonous data detection system 200 detected has been poisoned. Specifically, the backdoor removal system 500 comprises a labeling unit 510 configured to re-label each poisonous data point identified by the poisonous data detection system 200 with a new label. For example, if a poisonous data point comprises an altered image of a stop sign with a label incorrectly indicating that an object captured in the altered image is a speed limit sign, the labeling unit 510 is configured to replace the label with a new label that correctly indicates the object is a stop sign.

In one embodiment, if a user confirms that a set of data points is poisonous (e.g., when the poisonous data detection system 200 provides an average of the data points to the user for user confirmation as to whether the data points are poisonous or legitimate), the user provides the poisonous data detection system 200 and/or the backdoor removal system 500 with a correct label for the data points that is then used in the re-labeling.

In one embodiment, the backdoor removal system 500 comprises a splitting unit 520 configured to split (i.e., partition) all poisonous data points identified by the poisonous data detection system 200 into a new training set and a new test set. In one embodiment, the poisonous data points are split in accordance with a pre-determined ratio, such as an 80/20 ratio in which 80% of the poisonous data points are included in the new training set and a remaining 20% of the poisonous data points are included in the new test set.

In one embodiment, the backdoor removal system 500 comprises a training unit 530 configured to train the neural network by applying backpropagation to the neural network using the new training set.

In one embodiment, the backdoor removal system 500 comprises a testing unit 540 configured to: (1) test the neural network after the training unit 530 has applied backpropagation to neural network, and (2) determine an error rate of the neural network, wherein the error rate is indicative of a likelihood of misclassifications by the neural network.

In one embodiment, if the error rate is low (e.g., does not exceed a pre-determined error threshold), the testing unit 540 validates the neural network as no longer poisoned (e.g., backdoor-free). If the error rate of a neural network is not low (e.g., meets or exceeds the pre-determined error threshold), the testing unit 200 triggers the training unit 240 to continue training the neural network.

Figure 7:
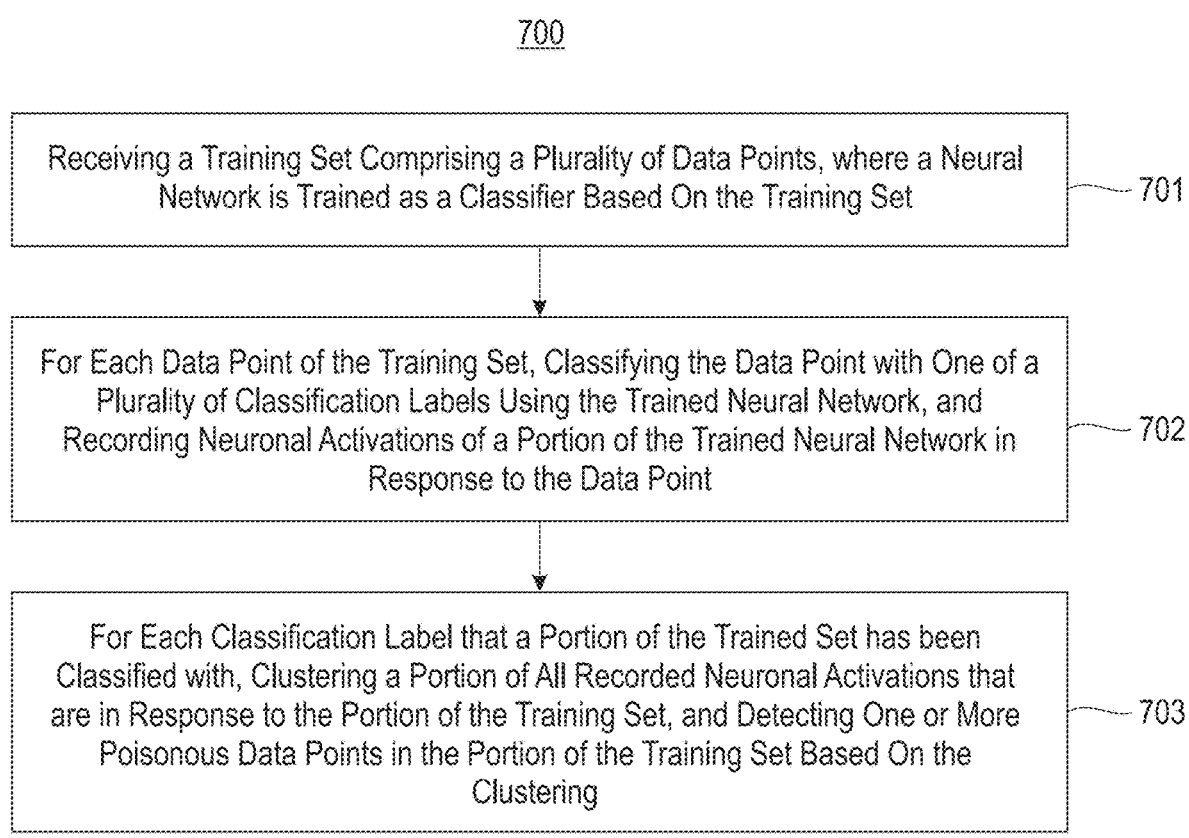
FIG. 7 is a flowchart for an example process for detecting poisonous data, in accordance with an embodiment of the invention.

FIG. 7 is a flowchart for an example process 700 for detecting poisonous data, in accordance with an embodiment of the invention. Process block 701 includes receiving a training set comprising a plurality of data points, where a neural network is trained as a classifier based on the training set. Process block 702 includes, for each data point of the training set, classifying the data point with one of a plurality of classification labels using the trained neural network, and recording neuronal activations of a portion of the trained neural network in response to the data point. Process block 703 includes, for each classification label that a portion of the training set has been classified with, clustering a portion of all recorded neuronal activations that are in response to the portion of the training set, and detecting one or more poisonous data points in the portion of the training set based on the clustering.

In one embodiment, process blocks 701-703 are performed by one or more components of the poisonous data detection system 200, such as the activations unit 210, the segmentation unit 220, the clustering unit 230 and the analysis unit 240.

Figure 8:
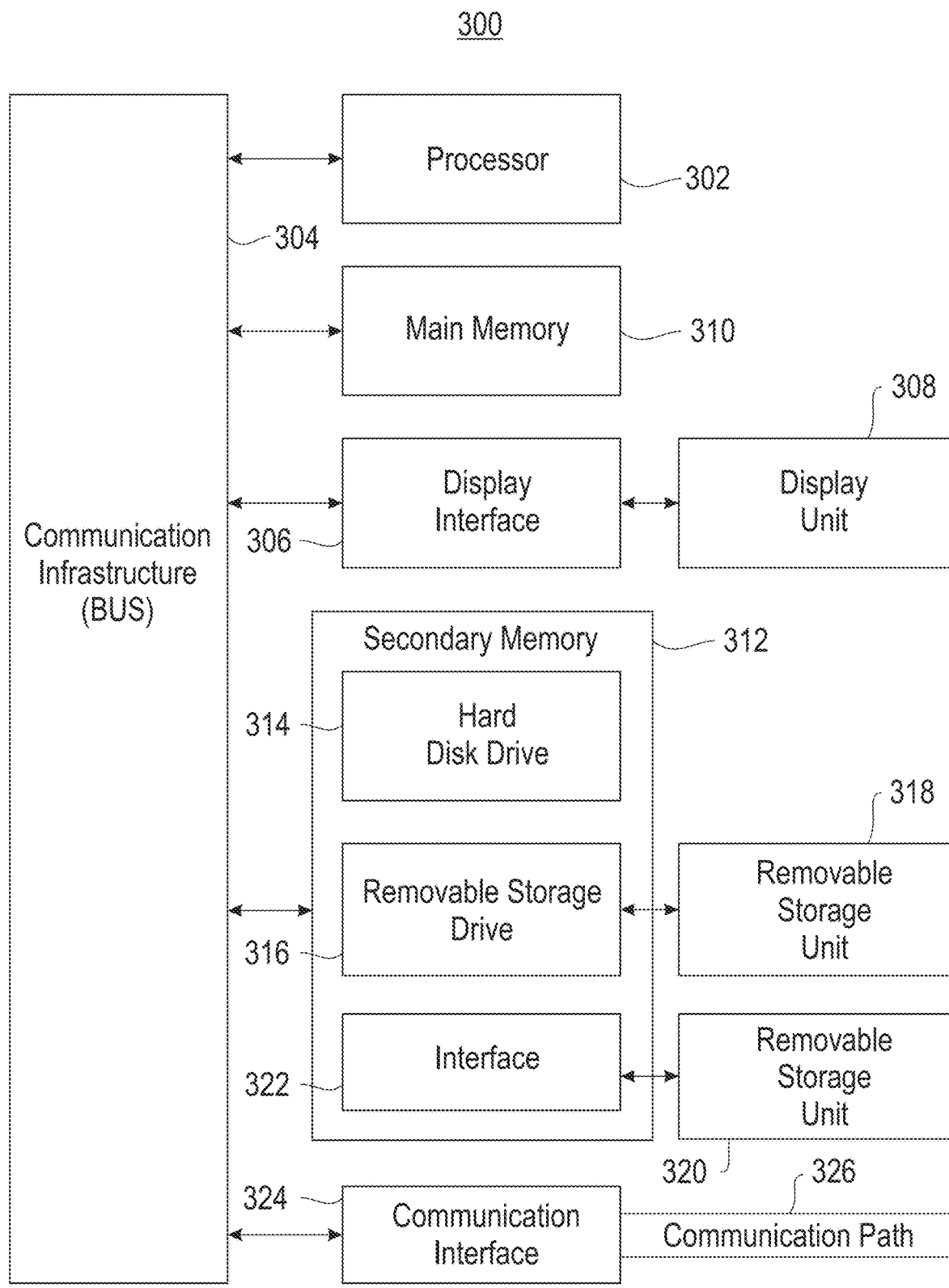
FIG. 8 is a high level block diagram showing an information processing system useful for implementing an embodiment of the present invention.

FIG. 8 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. In one embodiment, the computer system also includes a main memory 310, preferably random access memory (RAM), and also includes a secondary memory 312. In one embodiment, the secondary memory 312 includes, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 includes other similar means for allowing computer programs or other instructions to be loaded into the computer system. Such means include, for example, a removable storage unit 320 and an interface 322. Examples of such means include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

In one embodiment, the computer system also includes a communication interface 324. Communication interface 324 allows software and data to be transferred between the computer system and external devices. In one embodiment, examples of communication interface 324 include a modem, a network interface (such as an Ethernet card), a communication port, or a PCMCIA slot and card, etc. In one embodiment, software and data transferred via communication interface 324 are in the form of signals which are, for example, electronic, electromagnetic, optical, or other signals capable of being received by communication interface 324. These signals are provided to communication interface 324 via a communication path (i.e., channel) 326. In one embodiment, this communication path 326 carries signals and is implemented using wire or cable, fiber optics, a phone line, a cellular phone link, an RF link, and/or other communication channels.

Embodiments of the present invention provide a system, a method, and/or a computer program product. In one embodiment, the computer program product includes a computer readable storage medium (or media) having computer readable program instructions thereon for causing a processor to carry out aspects of the present invention. The computer readable storage medium can be a tangible device that can retain and store instructions for use by an instruction execution device. In one embodiment, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of embodiments of the present invention are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one embodiment, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one embodiment, these computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one embodiment, these computer readable program instructions are also stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one embodiment, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, in one embodiment, each block in the flowchart or block diagrams represents a module, segment, or portion of instructions, which comprises one or more executable instructions for implementing the specified logical function(s). In some alternative implementations, the functions noted in the block occur out of the order noted in the figures. For example, in one embodiment, two blocks shown in succession are, in fact, executed substantially concurrently, or the blocks are sometimes executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the present invention provide a system, computer program product, and method for implementing the embodiments of the invention. Embodiments of the present invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the present invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. Various embodiments of the invention were chosen and described in order to best explain the principles of the embodiments of the invention and the practical application, and to enable others of ordinary skill in the art to understand the embodiments of the invention with various modifications as are suited to the particular use contemplated.

The invention claimed is:

1. A method comprising:
 receiving a training set comprising a plurality of data points, wherein a neural network is trained as a classifier based on the training set;
 for each data point of the training set:
  classifying the data point with one of a plurality of classification labels using the trained neural network; and
  recording neuronal activations of a portion of the trained neural network in response to the data point; and
 for each classification label that a portion of the training set has been classified with:
  clustering a portion of all recorded neuronal activations that are in response to the portion of the training set; and
  detecting one or more poisonous data points in the portion of the training set based on the clustering.

2. The method of claim 1, further comprising:
 training an initial neural network based on the training set, resulting in the trained neural network.

3. The method of claim 1, wherein the training set is an untrusted data set.

4. The method of claim 1, wherein the neural network is a convolutional neural network.

5. The method of claim 4, wherein the portion of the neural network is a last hidden layer in the neural network.

6. The method of claim 1, wherein the neural network is a region-based convolutional neural network (R-CNN).

7. The method of claim 6, wherein the portion of the neural network is a last hidden layer corresponding to a proposed region of interest in the R-CNN.

8. The method of claim 1, further comprising:
segmenting all the recorded neuronal activations into one or more segments in accordance with the plurality of classification labels; and
for each segment, clustering neuronal activations included in the segment.

9. The method of claim 8, wherein clustering neuronal activations included in the segment comprises:
applying a clustering method that clusters the neuronal activations included in the segment into two clusters.

10. The method of claim 9, further comprising:
classifying a smallest cluster of the two clusters as poisonous, wherein, for each neuronal activation included in the smallest cluster, a data point in the training set that resulted in the neuronal activation is identified as a poisonous data point.

11. The method of claim 8, wherein clustering neuronal activations included in the segment comprises:
applying a clustering method that clusters the neuronal activations included in the segment into a set of clusters; and
determining a total number of clusters included in the set of clusters.

12. The method of claim 11, further comprising:
classifying the training set as legitimate in response to determining the total number of clusters is one.

13. The method of claim 11, further comprising:
in response to determining the total number of clusters is more than one:
classifying a largest cluster of the set of clusters as legitimate; and
classifying each remaining cluster of the set of clusters as poisonous, wherein, for each neuronal activation included in the remaining cluster, a data point in the training set that resulted in the neuronal activation is identified as a poisonous data point.

14. The method of claim 8, further comprising:
for each cluster generated in response to the clustering:
for each neuronal activation included in the cluster, identifying a data point in the training set that resulted in the neuronal activation;
generating an average of all data points identified; and
providing the average to a user to determine whether all the data points identified are poisonous or legitimate.

15. A system comprising:
at least one processor; and
a non-transitory processor-readable memory device storing instructions that when executed by the at least one processor causes the at least one processor to perform operations including:
receiving a training set comprising a plurality of data points, wherein a neural network is trained as a classifier based on the training set;
for each data point of the training set:
classifying the data point with one of a plurality of classification labels using the trained neural network; and
recording neuronal activations of a portion of the trained neural network in response to the data point; and
for each classification label that a portion of the training set has been classified with:
clustering a portion of all recorded neuronal activations that are in response to the portion of the training set; and
detecting one or more poisonous data points in the portion of the training set based on the clustering.

16. The system of claim 15, wherein the operations further comprise:
segmenting all the recorded neuronal activations into one or more segments in accordance with the plurality of classification labels; and
for each segment, clustering neuronal activations included in the segment.

17. The system of claim 16, wherein clustering neuronal activations included in the segment comprises:
applying a clustering method that clusters the neuronal activations included in the segment into two clusters; and
classifying a smallest cluster of the two clusters as poisonous, wherein, for each neuronal activation included in the smallest cluster, a data point in the training set that resulted in the neuronal activation is identified as a poisonous data point.

18. The system of claim 16, wherein clustering neuronal activations included in the segment comprises:
applying a clustering method that clusters the neuronal activations included in the segment into a set of clusters;
determining a total number of clusters included in the set of clusters;
in response to determining the total number of clusters is one, classifying the training set as legitimate; and
in response to determining the total number of clusters is more than one:
classifying a largest cluster of the set of clusters as legitimate; and
classifying each remaining cluster of the set of clusters as poisonous, wherein, for each neuronal activation included in the remaining cluster, a data point in the training set that resulted in the neuronal activation is identified as a poisonous data point.

19. The system of claim 16, wherein the operations further comprise:
for each cluster generated in response to the clustering:
for each neuronal activation included in the cluster, identifying a data point in the training set that resulted in the neuronal activation;
generating an average of all data points identified; and
providing the average to a user to determine whether all the data points identified are poisonous or legitimate.

20. A computer program product comprising a computer-readable hardware storage medium having program code embodied therewith, the program code being executable by a computer to implement a method comprising:
receiving a training set comprising a plurality of data points, wherein a neural network is trained as a classifier based on the training set;
for each data point of the training set:
classifying the data point with one of a plurality of classification labels using the trained neural network; and recording neuronal activations of a portion of the trained neural network in response to the data point; and for each classification label that a portion of the training set has been classified with:

clustering a portion of all recorded neuronal activations that are in response to the portion of the training set; and detecting one or more poisonous data points in the portion of the training set based on the clustering.

* * * * *